US005214264A

United States Patent [19]
Dochterman

[11] Patent Number: 5,214,264
[45] Date of Patent: May 25, 1993

[54] PLASMA TORCH FRONT ELECTRODE

[75] Inventor: Jack L. Dochterman, Raleigh, N.C.

[73] Assignee: Plasma Energy Corporation, Raleigh, N.C.

[21] Appl. No.: 725,361

[22] Filed: Jun. 25, 1991

Related U.S. Application Data

[63] Continuation of Ser. No. 647,730, Jan. 30, 1991, abandoned.

[51] Int. Cl.[5] .................... B23K 9/00
[52] U.S. Cl. .................... 219/121.5; 219/119; 219/121.52
[58] Field of Search .................... 219/76.17, 121.48, 121.5, 219/121.51, 121.52, 119, 75

[56] References Cited

U.S. PATENT DOCUMENTS

| | | | |
|---|---|---|---|
| 3,097,292 | 7/1963 | Kugler et al. | 219/121.5 |
| 3,825,718 | 7/1974 | Moslashvili et al. | 219/121.39 |
| 4,463,245 | 7/1984 | McNeil | 219/121.48 |
| 4,540,868 | 9/1985 | Liebing | 219/121.48 |
| 4,549,065 | 10/1985 | Camacho et al. | 219/121.48 |
| 4,587,397 | 5/1986 | Camacho et al. | 219/121.48 |
| 4,620,080 | 10/1986 | Arata et al. | 219/121.5 |
| 4,841,114 | 6/1989 | Browning | 219/121.47 |
| 4,861,962 | 8/1989 | Sanders et al. | 219/121.5 |

*Primary Examiner*—Mark H. Paschall
*Attorney, Agent, or Firm*—Bell, Seltzer, Park & Gibson

[57] ABSTRACT

An enlarged and generally cup-shaped front section of the central passageway of the main body of the electrode has a rearwardly and inwardly sloping wall that extends at an angle within the range of approximately twenty to forty degrees relative to a plane perpendicular to the central axis of the electrode. The front section of the passageway has a readily replaceable and forwardly disclosed choke member having a central opening of a diameter within the range of 1.25 to 1.9 times the diameter of a rear section of the passageway. The rear section of the electrode passageway increases in diameter along a forward part of its length. The choke member comprises one of a set of similar choke members that differ from each other in the diameter of their central openings and/or in the electrically conductive material of which they are formed.

17 Claims, 1 Drawing Sheet

PLASMA TORCH FRONT ELECTRODE

This application is a continuation of application Ser. No. 07/647,730, filed Jan. 30, 1991, now abandoned.

FIELD OF THE INVENTION

This invention relates to the front electrodes used in plasma torches. The invention more specifically relates to improvements upon a plasma torch front electrode of the general type disclosed in U.S. Pat. No. 4,587,397, which is owned by the assignee for the present application.

BACKGROUND OF THE INVENTION

The front electrode of the plasma torch disclosed in U.S. Pat. No. 4,587,397 has a passageway extending axially thereof and opening from its opposite ends. The passageway has a relatively long and narrow rear section and a generally cup-shaped front section. The front passageway section includes a generally cylindrical outer wall that is connected at its rear end by an inwardly and rearwardly sloping shoulder-like wall with the front end of the rear section of the passageway. When the arc generated b the torch attaches to the sloping wall of the front electrode, erosion of the electrode is primarily in an axial, rather than radial, direction. This significantly increases the useful life of the electrode. It has been found, however, that at times the movement of gasses leak within the electrode will drive the arc from the sloping wall to the relatively thin cylindrical outer wall of the front section of the electrode passageway, which undesirably reduces the electrode's useful life. Additionally, the relatively large diameter of the passageway opening at the front end of the main body of the electrode may at times permit undesirable "wandering" of the plasma stream passing from the electrode, and/or "slash-back" of molten metal, debris or the like into the torch. Further, while the provision of a sloping shoulder or wall having the slope specified in U.S. Pat. No. 4,587,397 is optimum for certain operating conditions, it has been found that a wall having a greater slope is more desirable under other operating conditions.

SUMMARY OF THE INVENTION

The front electrode of the present invention includes an annular choke member that is concentrically mounting within, and adjacent the forward end of, the forward section of the passageway extending axially of the main body of the electrode. The means by which the choke ring is mounted in association with the front section of the electrode preferably consists of mating screw threads upon the outer surface of the choke ring and upon the inner surface of the cylindrical outer wall of the forward section of the electrode, or of other means similarly permitting rapid replacement of the choke ring with another when desired. Each choke ring preferably has an inner diameter within the range of 1.25 to 1.9 times the diameter of the rear section of the passageway through the front electrode, an axial dimension within the range of approximately 0.30 to 0.50 that of the axial dimension of the cylindrical wall of the front section of the electrode passageway, and has its front face substantially coplanar with the front wall of the main body of the electrode. Each choke ring preferably is formed of material which is electrically conductive and not readily erodible by the gasses supplied to the torch during operation of it. The sloping shoulder-like wall between the front and rear passageway sections of the electrode preferably extends at an angle within the range of approximately twenty-forty degrees relative to the central axis of the passageway through the electrode. The rear section of the passageway preferably increases in diameter along at least the forward part of its length.

DESCRIPTION OF THE PRIOR ART

In addition to previously noted U.S. Pat. No. 4,587,397, the following U.S. patents may also be of interest relative to the present invention: U.S. Pat. Nos. 4,540,868, 3, 097,292, 4,463,245, 4,620,080, 4,841,114, and 4,861,962.

DESCRIPTION OF THE DRAWINGS

Other features of the invention will be apparent from the following description of an illustrative embodiment thereof, which should be read in conjunction with the accompanying drawings in which.

DESCRIPTION OF THE PREFERRED EMBODIMENT

Figure 2:
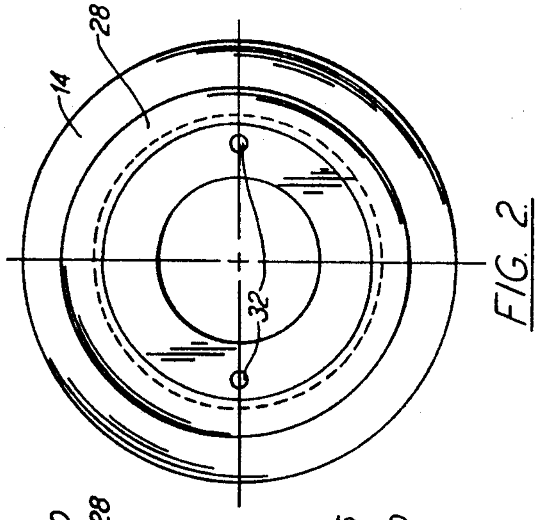
FIG. 2 is a front elevational view of the front electrode and adjacent portion cf the housing shown in FIG. 1.
Figure 1:
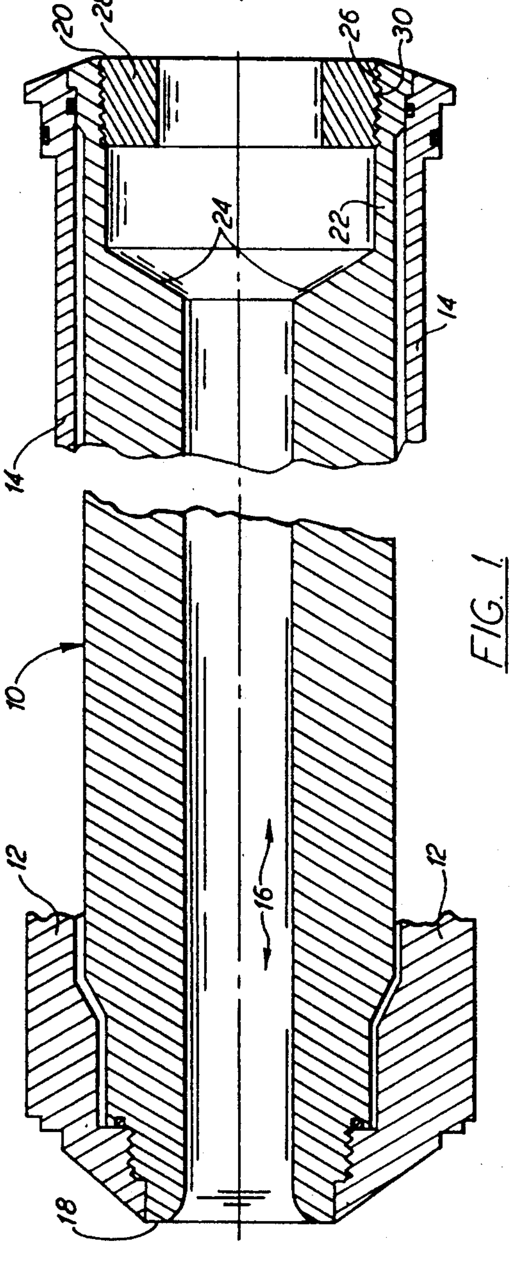
FIG. 1 is a foreshortened longitudinal sectional view of a plasma torch front electrode in accordance with the invention, some adjacent housing components of the torch also being fragmentarily shown.

FIG. 1 of the drawings shows the front electrode 10 and adjacent housing components 12, 14 of a plasma torch (not otherwise shown) which, except in certain respects discussed subsequently herein, may be and preferably is of a construction similar to that disclosed in U.S. Pat. No. 4,587,397.

A passageway 16 of circular cross-sectional shape extends axially of the main body, of electrode 10 and through the opposite rear and front (left and right, as viewed in FIG. 1) ends 18, 20 thereof. The rear (left, as viewed in FIG. 1) section of passageway 16 is relatively long and narrow, and preferably increases slightly in diameter along at least a forward part of its length. More specifically the peripheral wall of approximately the forward two-thirds of the rear section of passageway 16 diverges outwardly at an angle of approximately one-half degree rather than being parallel to the central axis of passageway 16.

The forward section of passageway 16 is of generally cup-shaped configuration. It includes a relatively thin cylindrical outer wall 22 that extends to front end 20 of electrode 10. The front section of electrode 10 also includes a shoulder-like wall 24 that slopes inwardly and rearwardly from the rear extremity of cylindrical wall 22 to the front end of the rear section of passageway 16. The slope cf wall 24 is such that the angle defined between it and a plane perpendicular to the central axis of electrode 10 preferably is in the range of approximately twenty-forty degrees, and more preferably is approximately thirty-three degrees. The forwardmost part of the inner surface of cylindrical wall 22 of the front section of passageway 16 has screw threads 26 thereon. An annular choke member 28 is releasably mounted within and concentrically of the aforesaid forward part of the front section of passageway 16, illustratively by screw threads 30 that are provided upon the outer surface of member 28 and matingly engage screw threads 26. Rotative movement may be imparted to choke member 28 during mounting and/or demounting thereof by a suitable tool (not shown) having members insertable into recesses 32 within the front face of member 28. As is indicated in FIG. 1, the front face of member 28 preferably is substantially coplanar with the front end 20 of the main body of electrode 10 when member 28 is in its installed position of use. The axial dimension of member 28 is preferably approximately forty percent of the axial dimension of cylindrical wall 22, and the radial thickness (i.e., the difference between the inner and outer diameter) of member 28 is significantly greater than that of cylindrical wall 22. The diameter of the central bore of member 28 is within the range of approximately 1.25 to 1.9 times the diameter of the rear section of passageway 16. Choke member 28 preferably is formed of the same metallic, electrically conductive material as the main body cf electrode 10, but might instead be formed of a different electrically conductive material.

Figure 4:
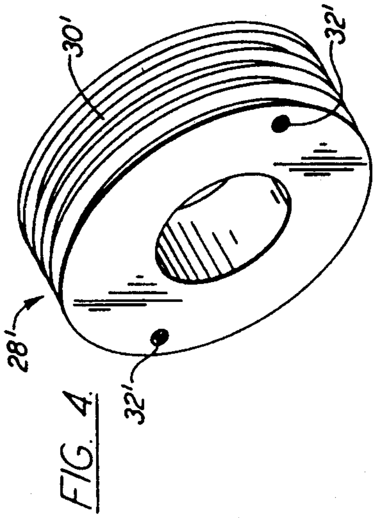
FIG. 4 is a perspective view of another choke member having an inner diameter different from the that of the choke ring in FIGS. 1–3.
Figure 3:
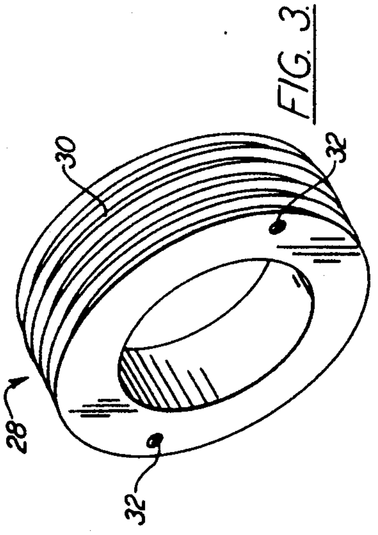
FIG. 3 is a front perspective view of the removable choke member of the front electrode shown in FIGS. 1 and 2.

Features of the choke member 28' shown in FIG. 4 of the drawings are designated by the same reference numerals used in the description of choke member 28, but with the addition of a prime designation. The choke members 28, 28' comprise part of a set of interchangeable choke members that have different inner diameters, and/or that are formed of different electrically conductive materials. A user of a plasma torch containing electrode 10 selects and employs whichever one of the choke members of the set is best suited, from the viewpoint of performance and/or durability, for the particular operation at hand.

If during operation of the torch containing electrode 10 the arc is driven from sloping electrode wall 24, the arc normally would attach to the choke member 28 (or 28', etc.). This is preferable to the arc's attachment to cylindrical wall 22 of electrode 10, for two reasons. Firstly, due to the greater radial dimension of member 28 a greater period of time is required for the arc-generated erosion to progress to the outer circumference of ring 28 than to the circumference of wall 22. Secondly, an eroded choke member 28 can be replaced much more quickly and economically than an entire electrode 10.

In addition to the aforesaid benefits, the use of an electrode 10 according to the present invention reduces the time required to "break-in" of a new electrode main body, minimizes "blow-back" into the electrode, and helps to "focus" or concentrate the plasma stream produced by the torch.

While a preferred embodiment of the invention has been shown and described, this was for purposes of illustration only, and not for purposes of limitation, the scope of the invention being made in accordance with the following claims.

I claim:

1. A plasma torch front electrode, comprising:

an elongate body formed of electrically conductive material, said body having opposite front and rear ends and having a central passageway ending longitudinally thereof and opening from said ends of said body;

said passageway having a substantially circular cross-sectional shape, a relatively long and narrow rear section extending to said rear end of said body, and a relatively short and wide front section extending to said front end of said body;

said front section of said passageway being generally cup-shaped and including a cylindrical outer wall extending to the front of said electrode, and a sloping shoulder-like wall extending angularly inwardly and rearwardly from the rear end of said outer wall to the front end of said rear section of said passageway;

an annular choke member, mounting means mounting said choke member within and in substantially concentric relationship with said cylindrical outer wall of said front section of said passageway and adjacent said front end of said electrode; said choke member having an inner diameter significantly less than the inner diameter of said cylindrical wall of said front section of said electrode, and within the range of 1.25 to 1.9 times the diameter of said rear section of said passageway.

2. A front electrode as in claim 1, wherein said mounting means includes mating screw threads upon the inner surface of said outer wall of said front section of said passageway and the outer surface of said choke member.

3. A front electrode as in claim 2, wherein the axial dimension of said choke member is approximately forty percent of the axial dimension of said cylindrical wall of said front section of said electrode.

4. A front electrode as in claim 3, wherein the front of said choke member is substantially coplanar with the front end of said front electrode.

5. A front electrode as in claim 4, wherein said choke member is formed of electrically conductive material.

6. A front electrode as in claim 5, wherein said sloping wall of said front section of said passageway extends at an angle within the range of approximately twenty degrees to forty degrees relative to the central axis of said passageway.

7. A front electrode as in claim 6, wherein the diameter of said rear section of said passageway increases along at least a forward part of its length.

8. A front electrode as in claim 7, wherein said forward part of said length of said rear section of said passageway is a major part of the length of said rear section of said passageway.

9. A front electrode as in claim 8, wherein said choke member is one of a set of interchangeable removable choke members having different internal diameters.

10. A front electrode as in claim 9, wherein each of said choke members has recesses within the front end thereof for receiving a tool for imparting rotation to said choke member relative to said front section of said passageway during mounting and demounting of said choke member.

11. A front electrode as in claim 10, wherein different ones of said choke members are formed of different metallic materials.

12. A plasma torch front electrode, comprising:

an elongate body formed of electrically conductive material, said body having opposite front and rear ends and having a central passageway ending longitudinally thereof and opening from said ends of said body;

said passageway having a substantially circular cross-sectional shape, a relatively long and narrow rear section extending to said rear end of said body, and a relatively short and wide front section extending to said front end of said body;

said front section of said passageway being generally cup-shaped and including a cylindrical outer wall extending to the front of said electrode, and a shoulder-like wall extending inwardly from the rear end of said outer wall to the front end of said rear section of said passageway;

an annular choke member mounted in substantially concentric relationship within said cylindrical outer wall of said front section of said passageway and adjacent said front end of said electrode; said choke member having an inner diameter significantly less than the inner diameter of said cylindrical wall and significantly greater than the diameter of said rear section of said passageway.

13. A front electrode as in claim 12, wherein the inner diameter of said choke member is at least about 1.25 times the diameter of said rear section of said passageway.

14. A front electrode as in claim 13, wherein the inner diameter of said cylindrical wall is at least about twice the diameter of said rear section of said passageway.

15. A front electrode as in claim 14, wherein the axial dimension of said choke member is approximately forty percent of the axial dimension of said cylindrical wall of said front section of said electrode, and the front of said choke member is substantially coplanar with the front end of said front electrode.

16. A front electrode as in claim 12, wherein said shoulder-like wall of said front section of said passageway extends at an angle within the range of approximately twenty degrees to forty degrees relative to the central axis of said passageway.

17. A front electrode as in claim 12, wherein said choke member is removably mounted to said cylindrical outer wall of said elongate body.

* * * * *